INVENTOR.
JAMES J. EBERL

United States Patent Office 3,010,860
Patented Nov. 28, 1961

3,010,860
COMPOSITE PACKAGING MATERIAL AND
PROCESS OF MANUFACTURE THEREOF
James J. Eberl, Moylan, Pa., assignor to Scott Paper
Company, Philadelphia, Pa., a corporation of Pennsylvania
Filed Apr. 4, 1958, Ser. No. 726,467
11 Claims. (Cl. 154—50)

The present invention relates to protective packaging material generally and more particularly to a composite wrapping material suitable for household and/or commercial packaging of foods and the like. This application constitutes a continuation in part of my earlier application, Serial No. 417,078, as filed in the U.S. Patent Office on March 18, 1954, now abandoned.

Wrapping materials and especially those which are used to protect foods, should possess certain essential characteristics such as strength, stability, crease resistance, etc., but of greater significance is the material's resistance to the passage of moisture and gases. Low moisture-vapor permeability insures a reasonable maintenance of the original moisture content of the wrapped food and low gas permeability prevents loss of flavor due to oxidation of the fats and resultant production of aldehydes, ketones and short-chain fatty acids.

Wax paper has long been used as a food wrapper and has many desirable features such as low cost, and at least a moderately acceptable moisture-vapor permeability in the uncreased state. However, handling of the paper, and its subsequent creasing (as in wrapping food for storage) usually ruptures the wax film coating the paper and opens the material to the transmission of vapors therethrough. Other materials such as metal foil and polyethylene film are superior to wax paper in some respects but are substantially more expensive than wax paper, particularly in such thicknesses as to be relatively impervious to vapors and to be self supporting, with the result that a substitution is not economically feasible.

Although prior art suggests materials in which the defects of common food wrappers are obviated or at least diminished, each has significant disadvantages. The present invention represents a new concept and provides a composite protective material wherein a discrete film of thermoplastic resinous polymer which is compatible with hydrocarbon wax and also a film of hydrocarbon wax are united in such manner as to create at their interface an intermediate layer of commingled polymer and wax imparting superior physical properties to the composite product.

One object of the present invention is to provide an inexpensive composite packaging material having low moisture-vapor permeability and low gas permeability.

A further object of the present invention is to provide multi-ply packaging material composed of low-cost laminae securely bonded to each other and which material is resistant to mechanical deterioration.

Still another object of my invention is to provide heat sealable composite packaging material.

Another object of the present invention is to provide a process for uniting a film of hydrocarbon wax with a sheet of synthetic film-forming polymeric material compatible with such hydrocarbon wax, while limiting the commingling of the film substances to the zone immediately adjacent the interface of the films.

Further objects and advantages will be apparent by reference to the following description of certain preferred embodiments thereof when taken in conjunction with the accompanying drawings, wherein.

Figure 1:
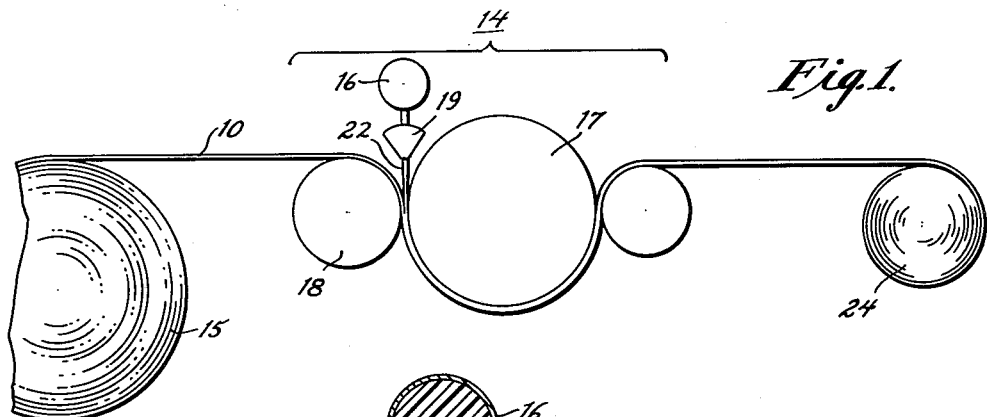
FIGURE 1 represents a schematic flow-diagram of one process for producing a composite sheet-material as contemplated by the present invention.
Figure 2:
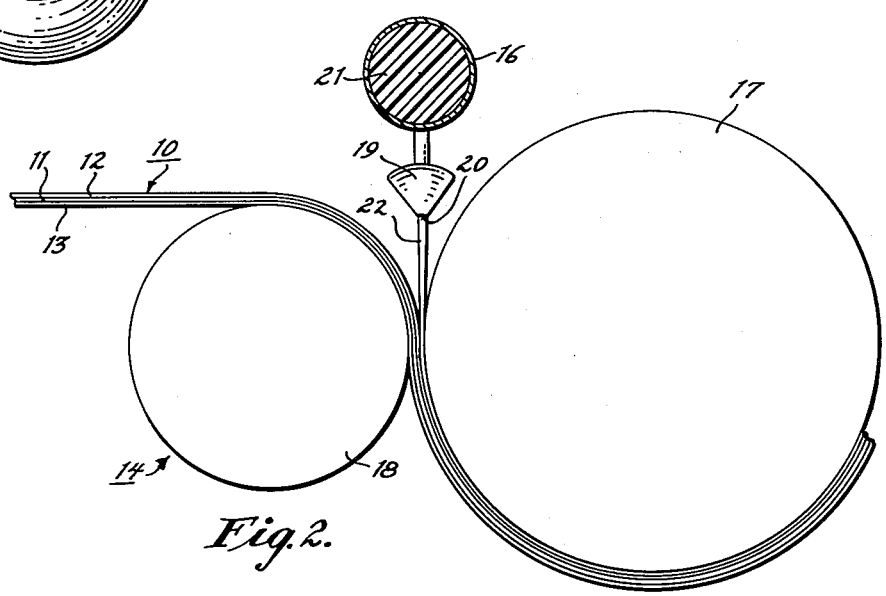
FIGURE 2 represents a schematic view on a larger scale of that portion of the process of FIGURE 1 wherein the synthetic film-forming material is applied to a waxed sheet.

The present invention comprehends the broad principle of laminating two or more of films of compatible material to form a multi-ply sheet. It will be readily apparent from the following description that the composite material may be formed with or without a supporting base therefor.

By way of illustration, one embodiment of the sheet of the present invention represents an adptation of commercially available wax paper, one type of which is produced by Scott Paper Company and sold under the trademark "Cut-Rite." Such a waxed paper 10 may consist of a base-sheet 11 of paper formed from chemical and/or semi-chemical pulps with a ream weight of from approximately 16 to 25 pounds, carrying a firmly adherent, substantially continuous coating of wax on each surface. The outer wax coatings indicated at 12 and 13 in FIGURE 3 may be applied to the base-sheet 11 by procedures well known to the art. The wax of the coating 12 and 13 may be a refined paraffin wax having a melting point in the range of from approximately 130° F. to 145° F., a microcrystalline wax or any other mineral wax which is colorless, odorless, tasteless, chemically inert and which is compatible with a special class of synthetic resins referred to hereinafter.

Conversion of this waxed paper 10 into the improved packaging material of the present invention entails the application of a covering film of synthetic resin to at least one side thereof. The resin film application is effected upon a bonding apparatus 14 which includes an extruder 16, a cooling roll 17 and a pressure roll 18. In a preferred method, a die 19 in communication with the extruder 16 is provided with an aperture 20 through which is discharged film forming resin material 21 as a relatively thin sheet 22 of substantial width. The sheet 22 flows continuously from the die 19 and is drawn, with further attenuation into the nip between the pressure roll 18 and the cooling roll 17. The waxed paper 10 is also fed between the rolls 17 and 18 in a manner which permits the sheet 22 to contact one of the wax coatings 12 or 13. Preferably, the waxed paper is at room temperature whereas the sheet 22 is supplied at a temperature which is above the softening point of the resin as well as the melting point of the wax film.

As the heated sheet 22 comes into contact with the wax coating 12, the wax melts at the surface permitting the wax and synthetic resin, under the thermally induced solvation action, to blend at the interface 23 while the films are firmly cohered on passage through the nip of the rolls 17 and 18. As the composite assembly continues to advance in contact with the cooling roll 17 (which is preferably maintained at a temperature of from 35° to 50° F.) the plastic materials "set" and further migration of wax into the resin or commingling between the resin and wax is halted. Manifestly, the rapidity with which the composite sheet is cooled will affect the depth of the intermediate zone of the blended wax and resin that results and in this manner a control of the nature of the final product is enabled. It is only necessary for the relaization of optimum benefits from this novel product that there be no loss of continuity of either of the contiguous films. Thereafter, the laminated material may be wound at room temperature into a parent roll 24 for storage and subsequent rewinding into smaller rolls, or it may be immediately cut and wound into small retail-size rolls.

Although it is preferred to form the sheet 22 in an extruder closely adjacent the nip of the rolls 17 and 18, it is to be understood that the sheet 22 may be preformed and unrolled from a parent roll supported near the nip. In such event, the sheet 22, as it is fed from the parent roll, should be heated so as to be at a proper temperature for drawing to the desired thickness as it enters the nip of the rolls 17 and 18 and to admit of bonding to one of the wax coatings 12 or 13 upon contact therewith.

Under actual conditions, the aperture 20 may be approximately 12 mils wide and spaced from the nip a sufficient distance to provide a sheet 22 which, at its point of application to the wax paper, is approximately 0.25 mil thick, although it is to be understood that the sheet 22 may vary in thickness from 0.1 mil to 1.0 mil, depending upon the protective properties demanded of the final product as well as the preferred cost thereof.

As has been indicated, the wax coatings 12 and 13 of the paper base 10 are formed of hydrocarbon waxes, including both the natural and synthesized waxes, with melting points in the range of from 130° to 145° F. It is, of course, possible to employ other paraffinic waxes whose melting points are outside of this preferred range but special care must be taken in such cases to prevent an improper blending of wax and resin in the final product.

It is also preferred that the resinous material forming the sheet 22 be polyethylene having a molecular weight in excess of 6000 as this material readily forms light gage films which exhibit the necessary compatibility with hydrocarbon waxes. Other polyolefins, such as polypropylene and polybutylene, which may be cast or extruded in film form, and possessing compatability with paraffinic waxes may be applied to the paper 10 under controlled conditions which result in blending of the wax and resin plies at the interface 23.

The nature of the waxed paper 10 entering the composite product will also affect the physical properties thereof. Customarily, the waxed paper 10 may be characterized as possessing a ream weight of 21½ pounds of which the base stock 11 comprises a paper having a ream weight of 17½ pounds. Waxed papers with a ream weight of from 30 to 32 pounds including a base stock of a paper having a ream weight of 25 pounds are available and may be used in practicing the present invention.

The finished product is distinguished by its low moisture-vapor and gas permeability factors, as formed or when creased and has the synthetic resin film adhered to the wax film through the medium of a commingling of materials at the interface between the films. The packaging material of the present invention combines the continuity and flexibility of resin film with the strength and adaptability to mechanical handling of supported wax films, the combined properties being superior to the additive effects of both of the films. The strength of the supported wax film permits use of thinner films of synthetic resin than would ever be possible with self-supported plastic films, and the film of synthetic resin, even in the lighter gages, reinforces the wax film and minimizes barrier ruptures when the composite material is creased.

Figure 4:
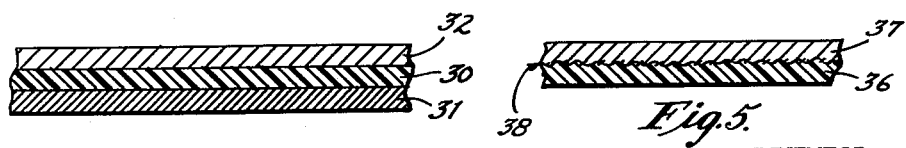
FIGURES 4 and 5 represent additional embodiments of the inventive concept.

In a second embodiment of the invention, illustrated in FIGURE 4, a film 30 of a synthetic resin, a polyolefin of the type heretofore described, is applied and secured to a heavy base 21 of paper board. Conveniently, the synthetic resin film of any desired thickness varying from 0.25 to 1 mil is extruded directly upon the paper board to which it adheres strongly upon cooling. A film 32 of a hydrocarbon wax is superposed upon the film 30 by dip waxing or roll coating as is conventional and the composite assembly is subjected to heat for a time sufficient to effect a blending of the two films at their interface, care being taken to arrest material migration before disruption of the films per se.

Figure 5:

If it is desired, the advantages of my invention can be realized through a self-supporting composite of resin and wax films free of any supporting base medium. As shown in FIGURE 5, a film 36 of a synthetic resin such as polyethylene of a thickness of from 0.5 to 3 mils is covered with a film 37 of refined paraffin wax after which the assembly is heated to a temperature sufficient to accomplish the blending of the materials at their interface 38, while the major portion of the individual film integrity is retained. In heating the assembly it is not necessary that either component become completely fluidized to enable the interface blending since material compatability insures a commingling thereof when only contiguous surfaces are rendered plastic or softened.

The desirable gas permeability characteristics of the several embodiments of my invention are illustrated by the following table which compares the gas permeability constants of polyethylene film with ordinary wax paper and with a composite resin-wax sheet-material. The gas permeability constants compared below are based upon the formula:

$$P = \frac{p}{760} \times V \times \frac{273}{T^\circ K.} \times \frac{1}{A} \times \frac{1}{t} \times \frac{d}{p'}$$

where $P$ = permeability constant
$p$ = barometric pressure (mm. of Hg)
$V$ = volume of transmitted gas (cc.)
$T$ = temperature degrees Kelvin
$A$ = area sq. cm.
$t$ = time in seconds
$d$ = thickness of film (cm.)
$p'$ = pressure differential across film (cm. of Hg)

| Unsupported and Creased 0.25 mil Polyethylene film | Creased Commercial Wax Paper | Creased Material of Present Invention (0.25 Mil Film of of Polyethylene |
|---|---|---|
| Varies from 4.08×10⁻⁹ to 18.5×10⁻⁹. | Instantaneous. | Varies from .00108×10⁻⁹ to .00290×10⁻⁹ |

A comparison of the moisture-vapor permeability measurements of the same materials also demonstrates the exceptional characteristics of the material of the present invention. The moisture-vapor permeability comparisons shown below are measured in grams of water vapor which pass through a square meter of material maintained at 75° F. in an atmosphere of 60% relative humidity in 24 hours:

| Unsupported and Creased 0.25 Mil Polyethylene Film | Creased Commercial Wax Paper | Creased Material of Present Invention Carrying a 0.25 Mil Film of Polyethylene |
|---|---|---|
| Varies from 3.0 to 3.8. | Varies from 17.4 to 22.7. | 0.0 |

Figure 3:
FIGURE 3 represents a greatly enlarged cross-sectional view of a portion of one embodiment of sheet-material of the present invention.

It is believed, that for most purposes, the embodiment of my invention illustrated in FIGURE 3 of the drawing will be preferred. The use of paper of moderate ream weight as a support for the parafin wax layer to which a resin film is adhered permits the formation of a flexible wrapping material which is ideally suited as a "freezer wrap," affording excellent protection for any foodstuffs encased therein. Where the multiple, spaced wax films are not necessary, one, that is the one not adjacent the resin film, may be eliminated to provide a cheaper laminate having an outside paper layer available for printing.

The paper support for the wax film may be of increasing weight up to the paper board incorporated in the product shown in FIGURE 4. Faced corrugated paper board surfaced with the composite film of my invention will function with equal success in the formation of linerless folding cartons or interlining material for industrial packages. Metal foils, of which aluminum is typical, and films of non-fibrous materials, such as regenerated cellulose, may also be used to support the wax-resin composite film.

In those modifications wherein a wax "overcoating" forms the outside layer of the composite product, a heat seal operation on standard packaging machines is easily effected.

From the foregoing description of my inventive concept it will be obvious that various changes, rearrangements and modifications in the component elements of the laminated packaging material are possible without departing from the scope of the invention as defined in the appended claims.

What I claim is:

1. A laminar protective packaging material composed of at least one film of a thermoplastic resinous polymer which is compatible with hydrocarbon wax and one film of hydrocarbon wax, said films being united only at their interface by a blending of the resin and wax.

2. A laminar protective packaging material composed of at least one film of a thermoplastic resinous polymer which is compatible with hydrocarbon wax and one film of hydrocarbon wax superposed thereon, said films being adhered substantially completely only at their interface by a blending of the polymer and wax.

3. A laminar protective packaging material composed of at least one film of a polyolefin resin which is compatible with hydrocarbon wax and one film of hydrocarbon wax, said films being adhered substantially completely only at their interface by a blending of the resin and the wax.

4. A laminar protective packaging material as defined in claim 3 in which the resin film is polyethylene and the wax film is a paraffin wax.

5. A laminar protective packaging material as defined in claim 3 in which the composite resin and wax films are supported upon a base.

6. A laminar protective packaging material as defined in claim 3 in which the composite resin and wax films are disposed upon and secured to a base formed primarily of cellulose.

7. The method of forming a laminar protective packaging material having low vapor permeability which comprises bringing together a film of a thermoplastic resinous polymer compatible with hydrocarbon wax with a film of hydrocarbon wax and subjecting the composite to a temperature sufficient to soften at least the surfaces of the films and to effect a blending only at the interface therebetween and subsequently cooling the composite to arrest material commingling and to maintain film continuity therein.

8. The process of coating base material with a hydrocarbon wax film and a film of a polyolefin resin compatible with hydrocarbon wax, said process comprising coating the base material with the wax film, heating the resin film material sufficiently to soften at least the surfaces thereof and applying it to the wax film whereby to occasion a heat transfer and to induce material commingling only at the resin-wax film interface and substantially immediately thereafter chilling the composite to arrest material commingling and to retain film continuity therein.

9. The process of coating base material with a hydrocarbon wax film and a film of polyethylene, said process comprising coating the base material with the wax film, heating the polyethylene film material to a temperature sufficient to soften at least the surfaces thereof and applying it to the wax film so as to initiate material blending at the interface between the films, and substantially immediately thereafter and without destroying the continuity of either film chilling each film to its solid state.

10. The method of coating base material with a composite protective surfacing of low vapor permeability which comprises coating the base material with an adherent film of polyolefin resin which is compatible with hydrocarbon wax, superposing a film of hydrocarbon wax upon the resin film and subjecting the composite to a temperature sufficient to soften at least the contiguous surfaces of the films and to effect a blending only at the interface therebetween and subsequently restoring the films to the solid state without interruption of film continuity.

11. A laminar protective packaging material comprising a paper base and at least two films joined together and to one side of said base, one of which films is formed substantially entirely of polyethylene and the other of which is formed substantially entirely of hydrocarbon wax, the wax film intervening the base and the polyethylene film, said films being adhering substantially completely only at their interface by an immediate layer blending of the polyethylene and the wax.

References Cited in the file of this patent

UNITED STATES PATENTS

| 2,369,450 | Fischer | Feb. 13, 1945 |
| 2,453,644 | Steinkraus | Nov. 9, 1948 |
| 2,572,959 | Sparks et al. | Oct. 30, 1951 |
| 2,582,037 | Hyde | Jan. 8, 1952 |
| 2,607,712 | Sturken | Aug. 19, 1952 |
| 2,754,278 | Wilson et al. | July 10, 1956 |
| 2,828,237 | Rosser | Mar. 25, 1958 |

FOREIGN PATENTS

| 641,568 | Great Britain | Aug. 16, 1950 |